United States Patent
Witz et al.

(10) Patent No.: US 8,196,611 B2
(45) Date of Patent: Jun. 12, 2012

(54) PIPE

(75) Inventors: Joel Aron Witz, Newdigate (GB); David Charles Cox, Thornton Heath (GB)

(73) Assignee: BHP Billiton Petroleum Pty Ltd. (AU)

( * ) Notice: Subject to any disclaimer, the term of this patent is extended or adjusted under 35 U.S.C. 154(b) by 549 days.

(21) Appl. No.: 12/377,258

(22) PCT Filed: Aug. 10, 2007

(86) PCT No.: PCT/GB2007/003058
§ 371 (c)(1),
(2), (4) Date: Feb. 11, 2009

(87) PCT Pub. No.: WO2008/017865
PCT Pub. Date: Feb. 14, 2008

(65) Prior Publication Data
US 2010/0224277 A1    Sep. 9, 2010

(30) Foreign Application Priority Data
Aug. 11, 2006  (GB) .................................. 0616052.7

(51) Int. Cl.
*F16L 11/00* (2006.01)
(52) U.S. Cl. ........ 138/138; 138/149; 138/143; 138/133; 138/109
(58) Field of Classification Search ................. 138/138, 138/125, 143, 133, 109
See application file for complete search history.

(56) References Cited

U.S. PATENT DOCUMENTS

| 956,076 A | 4/1910 | Greenfield |
|---|---|---|
| 1,178,559 A | 4/1916 | Vautier |
| 1,588,606 A | 6/1926 | Oden |
| 1,599,775 A | 9/1926 | Lamb et al. |
| 1,607,909 A | 11/1926 | Oden |
| 1,785,345 A | 12/1930 | Hasemann |
| 1,810,032 A | 6/1931 | Schulthess |
| 1,901,330 A | 3/1933 | Poberejsky |
| 1,911,486 A | 5/1933 | Bacheldor et al. |
| 2,011,781 A | 8/1935 | Tabozzi |
| 2,184,984 A | 12/1939 | Van Stone et al. |
| 2,371,363 A | 3/1945 | Smith |
| 2,610,869 A | 9/1952 | Percy |
| 2,661,026 A | 12/1953 | Schulthess |

(Continued)

FOREIGN PATENT DOCUMENTS

CN    1441884    9/2003

(Continued)

OTHER PUBLICATIONS

Patent Application entitled, "Improvements Relating to Pipe", by Joel Aron Witz filed Mar. 12, 2010 as U.S. Appl. No. 12/677,852.

(Continued)

*Primary Examiner* — Patrick F Brinson
(74) *Attorney, Agent, or Firm* — Brinks Hofer Gilson & Lione; G. Peter Nichols

(57) ABSTRACT

A pipe comprising an outer rigid conduit and an inner tubular structure, the inner tubular structure comprising a flexible hose, wherein the hose comprises a tubular body disposed between inner and outer gripping members, the tubular body including a sealing layer, and being formed of a material capable of withstanding cryogenic temperatures, wherein the inner tubular structure has insulation properties sufficient to protect the outer conduit from the low temperature of cryogenic fluid flowing within the inner tubular structure.

29 Claims, 2 Drawing Sheets

U.S. PATENT DOCUMENTS

| | | | |
|---|---|---|---|
| 2,706,494 A | 4/1955 | Morse | |
| 2,825,364 A | 3/1958 | Cullen et al. | |
| 2,829,671 A | 4/1958 | Ernst et al. | |
| 2,858,147 A | 10/1958 | Guarnaschelli | |
| 2,940,778 A | 6/1960 | Kaiser | |
| 3,004,779 A | 10/1961 | Cullen et al. | |
| 3,140,106 A | 7/1964 | Thomas et al. | |
| 3,189,370 A | 6/1965 | Marshail | |
| 3,240,643 A | 3/1966 | Schroeder et al. | |
| 3,287,194 A | 11/1966 | Waddell, Jr. | |
| 3,318,620 A | 5/1967 | Cullen et al. | |
| 3,333,325 A | 8/1967 | Stanley | |
| 3,462,177 A | 8/1969 | Skinner et al. | |
| 3,538,728 A | 11/1970 | Tribey | |
| 3,603,719 A | 9/1971 | Lejeune | |
| RE28,155 E | 9/1974 | Dow et al. | |
| 3,856,052 A | 12/1974 | Feucht | |
| 3,919,026 A | 11/1975 | Mizutani et al. | |
| 4,033,612 A | 7/1977 | Chevalier | |
| 4,063,757 A | 12/1977 | Fuhrmann | |
| 4,323,089 A | 4/1982 | Kadono et al. | |
| 4,330,143 A | 5/1982 | Reneau | |
| 4,344,908 A | 8/1982 | Smith et al. | 264/203 |
| 4,351,366 A | 9/1982 | Angioletti | |
| 4,377,186 A | 3/1983 | Genini et al. | |
| 4,411,845 A | 10/1983 | Tanahashi | |
| 4,422,993 A | 12/1983 | Smith et al. | 264/210.8 |
| 4,430,383 A | 2/1984 | Smith et al. | 428/364 |
| 4,436,689 A | 3/1984 | Smith et al. | 264/204 |
| 4,445,543 A | 5/1984 | Mead | |
| 4,634,153 A | 1/1987 | Kishton | |
| 4,826,354 A | 5/1989 | Adorian | |
| 4,924,679 A | 5/1990 | Brigham | 62/50.7 |
| 4,950,001 A | 8/1990 | Briggs | |
| 5,182,147 A | 1/1993 | Davis | |
| 5,480,193 A | 1/1996 | Echols et al. | |
| 5,485,870 A | 1/1996 | Kraik | |
| 5,639,128 A | 6/1997 | Belcher | |
| 5,647,563 A | 7/1997 | Gantner et al. | |
| 5,685,576 A | 11/1997 | Wolfe et al. | |
| 5,698,278 A | 12/1997 | Emond et al. | |
| 5,860,682 A | 1/1999 | Belcher | |
| 5,893,681 A | 4/1999 | Boden | |
| 6,110,550 A | 8/2000 | Jarrin et al. | |
| 6,334,466 B1 | 1/2002 | Jani et al. | |
| 6,659,510 B1 | 12/2003 | Ikegami et al. | |
| 6,874,542 B2 | 4/2005 | Mayau et al. | |
| 6,923,477 B2 | 8/2005 | Buon et al. | |
| 7,243,686 B2 | 7/2007 | Burke et al. | |
| 7,712,792 B2 | 5/2010 | Burke et al. | |
| 7,735,524 B2 | 6/2010 | Burke et al. | |
| 7,743,792 B2 | 6/2010 | Burke et al. | |
| 2003/0178085 A1* | 9/2003 | Burke et al. | 138/138 |
| 2004/0066035 A1 | 4/2004 | Buon et al. | |
| 2004/0112454 A1 | 6/2004 | Takagi | |
| 2004/0146676 A1 | 7/2004 | Ikemoto | |
| 2004/0256016 A1 | 12/2004 | Arima et al. | |
| 2006/0124189 A1* | 6/2006 | Burke et al. | 138/127 |
| 2007/0024051 A1 | 2/2007 | Witz et al. | |
| 2009/0320951 A1 | 12/2009 | Witz et al. | |
| 2010/0059133 A1 | 3/2010 | Witz et al. | |
| 2010/0180976 A1 | 7/2010 | Witz et al. | |
| 2010/0183371 A1 | 7/2010 | Witz et al. | |
| 2010/0229991 A1 | 9/2010 | Witz et al. | |
| 2010/0229992 A1 | 9/2010 | Witz et al. | |

FOREIGN PATENT DOCUMENTS

| | | |
|---|---|---|
| CN | 1732352 | 2/2006 |
| DE | 1 425 453 | 7/1969 |
| DE | 2 431 277 | 1/1975 |
| DE | 2 948 416 | 6/1981 |
| DE | 3 440 459 | 5/1986 |
| DE | 9 207 276 | 10/1992 |
| DE | 9 407 409 | 7/1994 |
| DE | 10 2005 04636 | 4/2006 |
| EP | 0 032 352 | 7/1981 |
| EP | 0 076 540 | 4/1983 |
| EP | 1832285 | 6/1986 |
| EP | 0215507 | 3/1987 |
| EP | 0 241 656 | 10/1987 |
| EP | 0438831 | 7/1991 |
| EP | 0833769 | 6/1996 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1 344 969 | 9/2003 |
| EP | 1 428 748 | 6/2004 |
| FR | 1499956 | 4/1966 |
| FR | 2194906 | 3/1974 |
| FR | 2235324 | 6/1974 |
| FR | 2753257 | 3/1998 |
| FR | 2753257 A1 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2339251 A | 1/2000 |
| GB | 2363440 | 12/2001 |
| GB | 2366345 | 3/2002 |
| GB | 2408307 | 5/2005 |
| JP | 1283494 | 11/1989 |
| JP | 03-075132 | 3/1991 |
| JP | 08011138 | 1/1996 |
| JP | 08336845 | 12/1996 |
| JP | 11325333 | 11/1999 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 0196772 | 12/2001 |
| WO | WO 2004/044472 | 5/2004 |
| WO | WO 2004044472 A | 5/2004 |
| WO | WO 2004079248 | 9/2004 |
| WO | WO 2005/119150 | 12/2005 |
| WO | WO 2006044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Hose End Fittings", by Joel Aron Witz filed Jun. 15, 2010 as U.S. Appl. No. 12/667,853.

Patent Application entitled, "Hose", by Joel Aron Witz filed Jun. 10, 2010 as U.S. Appl. No. 12/667,854.

International Search Report and Written Opinion for PCT Application Serial. No. PCT/GB2008/003098, dated Dec. 12, 2008, 6 pages.

International Preliminary Report on Patentability for PCT Application Serial No. PCT/GB2008/003098, dated Mar. 16, 2010, 5 pages.

International Search Report and Written Opinion for PCT Application Serial No. PCT/GB2008/003135, dated Dec. 12, 2008, 7 pages.

International Preliminary Report on Patentability for PCT Application Serial No. PCT/GB2008/003135, dated Mar. 16, 2010, 6 pages.

International Search Report and Written Opinion for PCT Application Serial No. PCT/GB2008/003121, dated Dec. 15, 2008, 10 pages.
International Prelimiary Report on Patentability for PCT Application Serial No. PCT/GB2008/003121, dated Mar. 16, 2010, 7 pages.
International Preliminary Examination Report for PCT Application Serial No. PCT/GB01/02562, published on Dec. 20, 2001.
International Preliminary Report on Patentability for PCT Application Serial. No. PCT/GB07/002446, dated Jan. 15, 2009.
International Preliminary Report on Patentability and Written Opinion for PCT Application Serial No. PCT/GB2007/003063, dated Feb. 26, 2009.

Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

\* cited by examiner

PIPE

BACKGROUND OF THE INVENTION

1. Field of the Invention

This invention relates to pipe, and more particular relates to pipe suitable for use in cryogenic applications. The invention is especially concerned with marine pipeline suitable for use on or near the seabed.

2. Description of the Related Art

There are many systems for transporting fluids from an offshore structure such as a ship or other platform to an undersea pipeline. Examples of such systems include:

(1) The conventional multi-buoy mooring (CMBM) system. In this system a riser runs directly from the offshore structure down to the pipeline, with supporting buoys arranged at intervals along the length of the hose.

(2) The single tower mono-mooring (STM) system. In this system a mooring tower is fixed to the seabed and extending to the surface of the sea. The mooring tower supports a riser extending from the surface of the sea to the pipeline. A hose or other pipe can extend from the offshore structure and be connected to the end of the hose at the top of the mooring tower.

(3) The single anchor-leg mooring (SALM) system. In this system, a buoy is located close to the offshore structure, the buoy being attached to, and supporting, a connector unit located on or near the seabed. A riser extends from the offshore structure to the connecting unit, then from the connecting unit to the pipeline. A further section of pipe runs from the connector unit to the pipeline.

(4) The catenary anchor-leg mooring (CALM) system. In this system, a buoy is located close to the offshore structure. A riser runs from the buoy to an underwater connector unit usually located on or near the seabed. A further section of pipe runs from the connector unit to the pipeline. A hose or other pipe can extend from the offshore structure and be connected to the end of the hose at the buoy. There are various configurations of the CALM system including the "Steep S" system, the "Lazy S" system and the "Chinese Lantern" system.

All the systems described above are well known in the art, and there are other possible systems that are not described above such as, for example, the use of an intermediate offshore structure. The essential feature of all these systems is that a riser is provided to deliver fluids from an offshore structure, such as a ship, to an underwater structure, such as a pipeline. The exact configuration of the riser, and of the support structure for the riser, can be varied depending prevailing conditions at the particular offshore location. Depending on the particular details of the system the riser comprises of submerged, floating and aerial sections.

Pipelines are generally constructed by one of two methods. The first and generally the most common method for both onshore and offshore pipelines is by welding together short lengths of metal pipe. This metal pipe may be coated for corrosion protection and often in marine applications there is a concrete coating for weight and mechanical protection. In some applications a thick coating such as syntactic polyurethane is applied for insulation. A coating is usually applied after a joint is made. In offshore construction the joints are either made in the substantially horizontal position from the lay barge (the so called "S lay" method) or in the near vertical position (the so called "J lay" method). The J lay method is usually the preferred method in deep water pipeline construction.

The alternative to the joining of short pipe sections on the offshore lay barge is the reeling method where the continuous pipeline is stored with some plastic deformation on a large reel. When the pipeline is unspooled from the reel it passes through a straightener to reverse the plastic deformation from storage.

In some applications the demands on insulation both in terms of thermal properties and water depth capacity is such that pipe-in-pipe systems have developed. Here a relatively short length of pipe is placed inside another pipe and they are joined together to make the continuous pipeline. The annulus between the concentric pipes may be either filled with insulation or be a vacuum.

Comparatively short onshore pipelines for cryogenic applications are common and these are typically constructed from austenitic stainless steels which are suitable for service at temperatures associated with liquid nitrogen at about −196° C. and liquefied natural gas at about −163° C. A known problem with onshore cryogenic pipeline applications is the thermal contraction as the pipeline is cooled from ambient temperature to the temperature of the conveyed liquefied natural gas. For austenitic stainless steels this is equivalent to a contraction of about 2.8 mm/m. In order to control the resulting thermal stresses expansion loops are regularly placed in the pipeline. A more recent development by Osaka Gas and others is to use pipelines made from an alloy of 36% nickel and 64% iron. This alloy is also known under the trade name of INVAR (Registered Trade Mark). This alloy, discovered in 1896 by Charles-Edouard Guillaume, has the property of minimal dimensional changes with temperature variations. When cooled from ambient temperature to the temperature of liquefied natural gas the contraction is 0.3 mm/m, an order of magnitude less than austenitic stainless steel. This is particularly advantageous in that it substantially reduces the need for extensive use of expansion loops.

Being metals, austenitic stainless steels and INVAR® have no effective insulation properties and therefore either conventional insulation is applied or the pipeline is allowed to self insulate with the build up of a layer of ice.

To date no marine pipelines have been built for cryogenic applications. A marine pipeline for conveying cryogenic fluids has to address the two problems of thermal expansion and insulation. This has led to the development of concentric pipe designs based on the conventional pipe-in-pipe design. These designs use INVAR® to solve the thermal expansion problem and high performance insulating materials such as aerogels in the resulting annuli are used to address the insulation problem. These designs are expensive in terms of materials and construction.

The present invention relates particularly to the pipeline which usually lies on or near the seabed. Such pipeline typically comprises an outer pipe, an inner pipe and an insulation layer arranged between the outer and inner pipes. As discussed above, in the prior art the outer pipe may be stainless steel and the inner pipe may be iron-nickel alloy, such as a material sold under the trade name INVAR. The material INVAR® is selected for this purpose because it has a low coefficient of thermal expansion, so that the inner and outer pipes expand and contract by similar amounts, despite the temperature variation between the inner and outer pipes, which is primarily caused by the presence of the insulation layer. Although pipelines with an INVAR® inner tube are effective at transporting cryogenic fluids, they are very expensive owing to the nickel content.

WO 2006044053 discloses a system for delivering cryogenic fluids from a ship to an underwater location. However, this patent does not contain any information about how to design the pipeline to which the cryogenic fluid is delivered.

It is an object of the invention to provide a pipe with the robustness and temperature resistant characteristics that are desirable for effectively transporting fluids through a pipeline.

BRIEF DESCRIPTION OF THE DRAWINGS

Reference is now made to the accompanying drawings, in which.

DETAILED DESCRIPTION OF THE INVENTION

Figure 1:
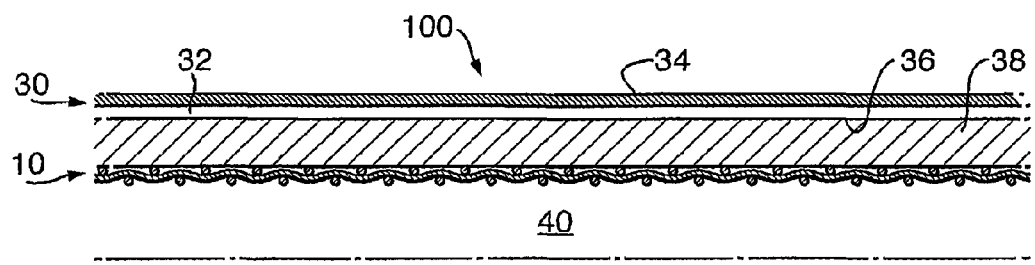
FIG. 1 is a cross-sectional view of a part of a pipe according to the invention.

According to a first aspect of the invention there is provided a pipe comprising an outer rigid conduit and an inner tubular structure, the inner tubular structure comprising a flexible hose, wherein the hose comprises a tubular body disposed between inner and outer gripping members, the tubular body including a sealing layer, and being formed of a material capable of withstanding cryogenic temperatures, wherein the inner tubular structure has insulation properties sufficient to protect the outer rigid conduit from the low temperature of cryogenic fluid flowing within the inner tubular structure.

In a particularly advantageous embodiment, the ends of the rigid conduit and the flexible hose are sealed to prevent the ingress of fluids between the rigid conduit and the hose.

In a further particularly advantageous embodiment, at least one end of the pipe is adapted to be connected to an underwater riser.

The pipe according to the invention is suitable for use in underwater locations. It will, however, be appreciated that, in use, not all of the pipe is necessarily disposed underwater.

The tubular body preferably comprises at least at least two of the reinforcing layers with the sealing layer sandwiched therebetween.

Preferably, a further reinforcing layer is provided between the outer gripping member and the axial strengthening means.

The ultimate strength of the reinforcing layer(s) is preferably between 100 and 700 kN for an 8" (200 mm) diameter hose. It is preferable that the bend strain at failure of the reinforcing layer(s) is in the range 2% to 15%.

It is preferred that the hose further includes an axial strengthening means. Preferably the axial strengthening means comprises a generally tubular sheath formed of a sheet of material provided in a tubular shape, such that the sheath can maintain the integrity of its tubular shape when subjected to axial tension. The hose may be provided with two or more tubular sheaths in order to further improve the performance of the hose under axial tension. It is particularly preferred that the axial strengthening means is provided in the form of a generally tubular braid. In this specification the term "braid" refers to a material which is formed of two or more fibres or yarns which have been intertwined to form an elongated structure. It is a feature of braid that it can elongate when subjected to an axial tension. It is a further feature of braid that, when provided in a tubular form, its diameter will reduce when the braid is subjected to axial tension. Thus by providing a tubular braid around the tubular body, or within the structure of the tubular body, the braid will exert a radially inward force on at least part of the tubular body when subjected to axial tension. It is preferred that the entire tubular sheath is provided in the form of the braid. However, it is possible for only one or more parts of the length of the tubular sheath to be provided in the form of the braid. It is also preferred that the braid extends all the way around the circumference of the tubular sheath. However, it is possible for only part of the circumference of the tubular sheath to be provided in the form of the braid. The braid may be provided in a biaxial form (i.e. in which the braid is formed of only two intertwining fibres or yarns) or in a triaxial form (i.e. in which there are also longitudinally extending fibres or yarns, for increased axial strength).

Although it is preferred to provide the axial strengthening means in the form of a braid, it may be provided in other forms which meet the functional requirements specified above. Thus, the axial strengthening means may be provided as a suitable arrangement of cords or ropes helically wrapped around the tubular body.

Thus, alternatively, or in addition, the axial strengthening means comprises a plurality of axial strengthening strips extending along the length of the hose. The axial strengthening strips are preferably equi-spaced around the circumference of the hose. There may be two, three, four, five, six, seven, eight or more strips. More preferably there are three, four, five or six strips, with four or six strips being most preferred. Preferably each axial strengthening strip is made of a fabric having a warp and a weft. More preferably, the warp of each axial strengthening strip is arranged at an angle of 0° to 10° to the longitudinal axis of the hose. Still more preferably, the warp of each axial strengthening strip is arranged at an angle of 0° to 5° to the longitudinal axis of the hose. Most preferably, the warp of each axial strengthening strip is arranged at an angle of 0° to 2° to the longitudinal axis of the hose.

The axial strengthening means may be disposed between the outer gripping member or the tubular body. Alternatively, the axial strengthening means may be incorporated within the tubular body, i.e., between the reinforcing layer and the sealing layer.

The materials of construction of the hose should be selected to enable the hose to perform in the environment for which it is intended. Thus, there is a need for the hose to be able to transport pressurised fluids therethrough without leakage of the fluid through the walls of the hose. There is also a need for the hose to withstand repeated flexing, and to withstand the axial stresses caused by the combination of the hose and fluid weight. Also, if the hose is intended for use in transporting cryogenic fluids, the materials should be capable of operating at extremely cold temperatures without any significant reduction in performance. The main purpose of the or each reinforcing layer is to withstand the hoop stresses which the hose is subjected to during transport of fluids therethrough. Thus, any reinforcing layer which has the required degree of flexibility, and which can withstand the necessary stresses, will be adequate. Also, if the hose is intended for transporting cryogenic fluids, then the or each reinforcing layer must be able to withstand cryogenic temperatures.

It is preferred the or each reinforcing layer is formed of a sheet of material which has been wound into a tubular form by winding the sheet material in a helical manner. This means that the or each reinforcing layer does not have much resistance to axial tension, as the application of an axial force will tend to pull the windings apart. The or each reinforcing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose.

In the preferred embodiment the or each reinforcing layer comprises a fabric, most preferably a woven fabric. The or each reinforcing layer may be a natural or synthetic material. The or each reinforcing layer is conveniently formed of a synthetic polymer, such as a polyester, a polyamide or a polyolefin. The synthetic polymer may be provided in the form of fibres, or a yarn, from which the fabric is created.

When the or each reinforcing layer comprises a polyester, then it is preferably polyethylene terephthalate. When the or each reinforcing layer comprises a polyamide, then it may be an aliphatic polyamide, such as a nylon, or it may be an aromatic polyamide, such as an aramid compound. For example, the or each reinforcing layer may be a poly-(p-phenyleneterephthalamide) such as KEVLAR (Registered Trade Mark).

When the or each reinforcing layer comprises a polyolefin, then it may be a polyethylene, polypropylene or polybutylene homopolymer, or a copolymer or terpolymer thereof, and is preferably monoaxially or biaxially oriented. More preferably, the polyolefin is a polyethylene, and most preferably the polyethylene is a high molecular weight polyethylene, especially UHMWPE. In the preferred embodiment, the axial strengthening means is also UHMWPE.

The UHMWPE used in the present invention would generally have a weight average molecular weight above 400,000, typically above 800,000, and usually above 1,000,000. The weight average molecular weight would not usually exceed about 15,000,000. The UHMWPE is preferably characterised by a molecular weight from about 1,000,000 to 6,000,000. The UHMWPE most useful in the present invention is highly oriented and would usually have been stretched at least 2-5 times in one direction and at least 10-15 times in the other direction.

The UHMWPE most useful in the present invention will generally have a parallel orientation greater than 80%, more usually greater than 90%, and preferably greater than 95%. The crystallinity will generally be greater than 50%, more usually greater than 70%. A crystallinity up to 85-90% is possible.

UHMWPE is described in, for example, U.S. Pat. No. 4,344,908, U.S. Pat. No. 4,411,845, U.S. Pat. No. 4,422,993, U.S. Pat. No. 4,430,383, U.S. Pat. No. 4,436,689, EP-A-183285, EP-A-0438831, and EP-A-0215507.

It is particularly advantageous that the or each reinforcing layer comprises a highly oriented UHMWPE, such as that available from DSM High Performance Fibres BV (a Netherlands company) under the trade name DYNEEMA, or that available from the US corporation AlliedSignal Inc. under the trade name SPECTRA. Additional details about DYNEEMA are disclosed in a trade brochure entitled "DYNEEMA; the top performance in fibers; properties and application" issued by DSM High Performance Fibers BV, edition February 1998. Additional details about SPECTRA are disclosed in a trade brochure entitled "Spectra Performance Materials" issued by AlliedSignal Inc., edition May 1996. These materials have been available since the 1980s.

In the preferred embodiment, the or each reinforcing layer comprises a woven fabric formed of fibres arranged in a weft and warp direction. We have found that it is particularly advantageous if the or each reinforcing layer is arranged such that the fabric warp direction is at an angle of less than 20° to the axial direction of the hose; we also prefer that this angle is greater than 5°. In the preferred embodiment, the or each reinforcing layer is arranged such that the fabric warp direction is at an angle of from 10° to 20°, most preferably about 15°, to the axial direction of the hose.

The purpose of the sealing layer is primarily to prevent the leakage of transported fluids through the tubular body. Thus, any sealing layer which has the required degree of flexibility, and which can provide the desired sealing function, will be adequate. Also, if the hose is intended for transporting cryogenic fluids, then the sealing layer must be able to withstand cryogenic temperatures.

The sealing layer may be made from the same basic materials as the or each reinforcing layer, in particular UHMWPE. As an alternative, the sealing layer may be a fluoropolymer, such as: polytetrafluoroethylene (PFTE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon-perfluoralkoxy—available from DuPont Fluoroproducts under the trade name Teflon PFA. These films may be made by extrusion or by blowing.

We prefer that the sealing layer is formed of a sheet of material which has been wound into a tubular form by winding the sheet material in a helical manner. As with the reinforcing layers, this means that the or each sealing layer does not have much resistance to axial tension, as the application of an axial force will tend to pull the windings apart. The sealing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose. If desired the sealing layer may comprise one or more heat shrinkable sealing sleeves (i.e. tubular in form) which are arranged over the inner reinforcing layer.

We prefer that the sealing layer comprises a plurality of overlapping layers of film. Preferably there would be at least 2 layers, more preferably at least 5 layers, and still more preferably at least 10 layers. In practice, the sealing layer may comprise 20, 30, 40, 50, or more layers of film. The upper limit for the number of layers depends upon the overall size of the hose, but it is unlikely that more than 100 layers would be required. Usually, 50 layers, at most, will be sufficient. The thickness of each layer of film would typically be in the range 50 to 100 micrometers.

It will, of course, be appreciated that more than one sealing layer may be provided.

The insulation layer may affixed to the inside of the rigid conduit, i.e., disposed inside the rigid conduit. Alternatively, the insulation layer may be disposed between the hose and the rigid conduit as a layer which is separate from the hose and rigid conduit.

However, it is preferred that the insulation layer is incorporated in the hose. The insulation layer may be affixed to the outside of the hose, i.e. disposed outside the outer gripping member, or it may be disposed within the outer gripping member between the outer gripping member and the sealing layer of the tubular body. The insulation layer may comprise any material conventionally used to provided insulation in cryogenic equipment, such as a synthetic foam material.

In one preferred embodiment, the insulation layer comprises an elongate member, made of an insulating material, having opposing longitudinal edges, the elongate member being helically wound around the tubular body such that the opposing longitudinal edges of the layer are in an adjacent or overlapping arrangement, wherein each longitudinal edge includes a formation capable of interengaging with a cooperating formation on the opposing longitudinal edge. The elongate member is preferably disposed outside the outer gripping member, and thereby forms a cover for the outer layer. A suitable elongate member is described in more detail in 2004/044472.

In another preferred embodiment, the insulation layer includes a fabric formed of basalt fibres. Suitable basalt fibre fabrics are available from the Sudaglass Fiber Company under the trade designations BT-5, BT-8, BT-10, BT-11 and BT-13. The preferred thickness of the fabric is from about 0.1 mm up to about 0.3 mm. If desired, a plurality of layers of the basalt fabric may be employed.

It will be appreciated that more than one insulation layer may be provided, and that the hose may include two or more different types of insulation layer.

An end fitting is preferably provided at each end of the hose. The end fitting is preferably of the type described in WO01/96772 or WO 2004/079248.

The inner and outer gripping members of the hose are preferably helical gripping members, more preferably helical wires. Thus, the gripping members preferably each forms a coil which grip and retain the tubular body, and any other intervening layers. Preferably the inner and outer coils are applied in a helical configuration having the same pitch, and the position of the coils of the outer coil are positioned half a pitch length offset from the position of the coils of the inner coil.

It is an important feature of the invention that the outer rigid conduit is adequately protected from the temperature of the cryogenic fluids being transported through the inner tubular structure. The outer conduit is typically a metal or a reinforced plastic, and it is important to keep the temperature of the inner surface of the outer rigid conduit above about −20° C. to provide adequate protections against the expansion/contraction effects described above. Preferably, the temperature of the inner surface of the outer rigid conduit should be kept within 30° C., more preferably within 20° C., of the temperature of the water surrounding the pipe. The surrounding water temperature is typically in the range 5° C. to 30° C. Thus, the temperature of the inner surface of the outer rigid conduit is preferably within the range of about 5° C. to about −20° C.

It is important that the temperature of the inner surface of the outer conduit remains above the brittle temperature of the material of the conduit. This brittle temperature is typically below −20° C. and it is dependent on the choice of material.

The required insulation can be achieved in a number of ways. One way is to rely solely on the insulation provided by the tubular body of the inner tubular structure. The materials of the tubular body may be such that they provide the required insulation. Furthermore, in the preferred embodiment, the materials of the tubular body are formed by wrapping multiple layers around a mandrel, in a process which leaves a certain amount of air within the layers, which provides additional insulation.

In another embodiment, the inner tubular structure is provided with an insulation layer formed of an insulating material. The insulation layer may be a special layer of the tubular body, or may be a layer formed around the outer gripping member.

In another embodiment, an insulation layer formed of an insulating material is provided between the inner tubular structure and the outer tube.

In another embodiment the insulation may be provided by a particulate insulating material (e.g. beads) disposed in the space between the inner tubular structure and the outer tube. The insulating particles may typically comprise of glass microspheres, perlite, polystyrene particles. The particles may be placed in the space simply by pumping them between the inner tubular structure and the outer conduit.

The required insulation may be provided by any combination of the specific techniques described above.

The rigid conduit is typically made of steel, particularly carbon steel or austenitic stainless steel. It may be provided with an external and/or an internal coating, which is/are preferably waterproof. Exemplary coatings are fusion bonded epoxy, polypropylene and polyethylene. The conduit is a tubular structure of any desired shape, although it would typically be of circular cross sectional shape.

The dimensions of the hose and rigid conduit may be selected either so that the hose and rigid conduit are in contact, or, preferably, so that there is a gap between the hose and rigid conduit. One or more spacers is preferably provided between in the inner tubular structure and the outer rigid conduit in order to maintain the conduit in a spaced relationship with respect to the inner tubular structure. The or each spacer preferably comprises a ring extending around the outside of the hose. A plurality of said rings may be provided along the length of the hose. The or each spacer ring may be, for example, polyurethane, PTFE, or a wood such as balsa or cork. The or each spacer ring may be rubber, if there is sufficient underlying insulation to protect the rubber spacer from the temperature of the cryogenic fluids to be transported through the inner tubular structure.

In an another embodiment, the spacer may be in the form of a rope or rod wrapped in a helical manner between the inner tubular structure and the outer tube. The wrapping may be in a long and/or a close pitch. The rope or rod may be, for example, a polyester rope, a polyurethane strip of rectangular cross section or a rubber of circular cross section.

The pipe according to the invention is useful in a wide variety of applications, but it is especially useful in the transportation of cryogenic fluids, especially fluids at a temperature below −100° C., more preferably fluids at a temperature at or below about −104° C. (the boiling point of ethylene), and most preferably fluids at a temperature at or below about −150° C. The pipe can effectively transport LNG at temperatures of about −162° C., and can effectively transport liquid oxygen or nitrogen at temperatures of about −183° C. or −196° C. respectively. In practice, the lowest practical temperature at which the pipe would be used would be from about −200° C. to −220° C.

The inner diameter of the rigid conduit is preferably at least 150 mm. More preferably, the inner diameter of the hose is preferably at least 150 mm. The inner diameter of the hose may be as large as 400 mm or even as large as 600 mm or 800 mm.

The pipe is typically supplied in lengths from 5 m to 20 m, although it is possible to supply lengths of pipe that are longer or shorter. The pipe sections can be joined together to provide a pipeline of the desired length, which may be a few tens or a few hundred or up to a few thousand meters.

The pipe according to the invention can be manufactured by placing the hose, or a string comprising multiple lengths of the hose connected end to end, within the rigid conduit, e.g., by pulling through the conduit.

In general, the operating pressure of the pipe would be in the range from about 500 kPa gauge up to about 2000 kPa gauge, or possibly up to about 2500 kPa gauge. These pressures relate to the operating pressure of the hose, not the burst pressure (which must be several times greater). The volumetric flow rate depends upon the fluid medium, the pressure and the inner diameter. Flowrates from 1000 $m^3/h$ up to 12000 $m^3/h$ are typical.

According to another aspect of the invention there is provided a pipeline comprising a plurality of pipes as described above, said pipes being connected end to end. The pipeline may be a few meters in length, but preferably the length of the pipeline is at least 100 m, more preferably at least 200 m, and most preferably at least 500 m. The pipeline is preferably not more than 5000 m in length, more preferably not more than 2000 m, and may be less than 1000 m in length. Typically the length is from about 100 m to 2000 m.

The pipe according to the invention is particularly useful in applications which involve the transportation of fluids, especially cryogenic fluids, along the seabed. The pipe may be required to transport the fluids between two offshore surface structures, or between an offshore surface structure and a land-based structure.

The surface offshore structure may be a permanent structure or a temporary structure, and is disposed at the surface of the water; it will be appreciated that in normal circumstances some of the structure will extend above the water surface and some of the structure will be submerged. A permanent structure is one which, after installation, remains permanently fixed in position above the seabed. Examples of permanent structures include a steel jacket support structure and a gravity base support structure. A temporary structure is one which can be moved from location to location. Examples of a temporary structure is a floatable vessel, usually having a steel or concrete hull, such as a ship or barge or semisubmersible or tension leg platform. Another example of a temporary structure is a floating production storage and off-loading unit. The surface offshore structure may have means for producing oil or gas from beneath the seabed. In addition, or instead, the surface offshore structure may have means for storing oil or gas, and the gas may be in liquid form.

Thus according to another aspect of the invention, there is provided a system for transporting fluids between a first surface offshore structure and a second surface offshore structure, comprising a first riser operatively connected to the first surface offshore structure and to a first end of a pipeline arranged along a seabed, a second riser operatively connected to the second surface offshore structure and to a second end of the pipeline, whereby fluid can flow from the first surface offshore structure to the second surface offshore structure or vice versa, wherein at least part of the pipeline is formed of a pipe according to the invention as described above.

According to another aspect of the invention, there is provided a system for transporting fluids between a first surface offshore structure and a land-based structure, comprising a first riser operatively connected to the first surface offshore structure and to a first end of a pipeline arranged along a seabed, a pipe operatively connected to the land based structure and to a second end of the pipeline, whereby fluid can flow from the first surface offshore structure to the land-based structure or vice versa, wherein at least part of the pipeline is formed of a pipe according to the invention as described above. The land-based structure may be, for example, a land-based storage facility.

In one embodiment the system includes a buoy located at the surface, and the first and/or second riser extends from the buoy to the subsurface offshore structure, and the hose is supported by the buoy. The CALM system described above is an example of such a system.

However, the system according to the invention may be a CMBM system, where the hose according to the invention extends directly from the surface offshore structure to the subsurface offshore structure.

The system according to the invention may instead be a SALM system, where a surface buoy is attached to a subsurface connector located at the seabed, and the hose extends directly from the surface offshore structure to the subsurface connector.

In the systems described above, there is preferably further provided a fluid connector supported by the buoy. The fluid connector is adapted to be connected in fluid communication with the upper end of the riser extending from the subsurface offshore structure, and to be connected in fluid communication with a pipe extending from the subsurface offshore structure. In this way fluid can flow from the pipe to the riser through the connector. The connector is preferably rotatable, so that the surface offshore structure can rotate about the buoy. This form of connector is usually known as a "swivel connector". An example of a swivel connector suitable for transporting cryogenic fluids is disclosed in EP0833769.

The system according to the invention may also be used in the type of system described in WO2006/044053, in which a submersible buoy is provided. Thus, according to another aspect of the invention there is provided a system for transporting a cryogenic fluid between a surface offshore structure and a pipeline, comprising: a) a first cryogenic riser having a first end and a second end, said first riser, wherein the vertical position of the first riser is adjustable, said second end of said first riser being located in a body of water and in fluid communication with said pipeline; and b) a first submersible turret connector connected to said first end of said first riser, said first connector adapted for releasably connecting to the surface offshore structure water so that a cryogenic fluid can be communicated between said surface offshore structure and said first end of said first riser, said first connector being moored to the bottom of said body of water such that the vertical position of said first connector can be changed, wherein first connector adapted to allow said surface offshore structure to rotate around said first connector upon the surface of said body of water while said first vessel is connected to said first connector, wherein at least part of the pipeline formed of pipe according to the invention, as described above.

It will be appreciated that the surface and subsurface offshore structures are disposed offshore, i.e., in a sea, ocean, lake, harbour or other body of water. However, there is no particular limitation on the distance of the structure from the shore, which may be, for example, a few meters, a few hundred meters, a few kilometers or several hundred kilometers.

According to another aspect of the invention there is provided a method of transporting a cryogenic fluid underwater, which comprises flowing the fluid through a pipe according to the invention as described above, wherein the pipe is disposed at an underwater located. Preferably the pipe is located on the seabed.

Figure 2:
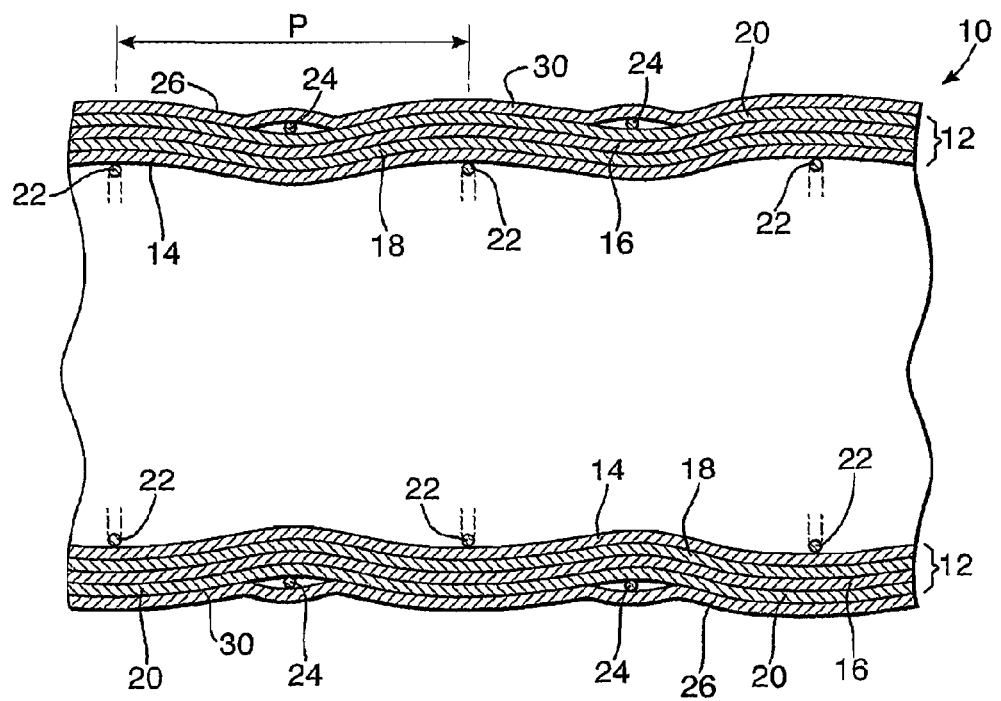
FIG. 2 is a cross-sectional view of an hose of the pipe shown in FIG. 1.

Referring first to FIGS. 1 and 2, a pipe according to the invention is generally designated 100. The hose comprises an hose 10 and an rigid conduit 30.

The hose 10 comprises a tubular body 12 which comprises an inner reinforcing layer 14, an outer reinforcing layer 16, and a sealing layer 18 sandwiched between the layers 14 and 16. A generally tubular sheath 20, in the form of a braid, which provides axial strengthening, is disposed around the outer surface of the outer reinforcing layer 16.

The tubular body 12 and the tubular sheath 20 are disposed between an inner helically coiled wire 22 and an outer helically coiled wire 24. The inner and outer wires 22 and 24 are disposed so that they are offset from one another by a distance corresponding to half the pitch length of the helix of the coils.

An insulation layer 26 is disposed around the outer wire 24. The insulation layer 26 may be, for example, a conventional insulating material, such as a plastics foam.

The reinforcing layers 14 and 16 comprise woven fabrics of a synthetic material, such as UHMWPE or aramid fibres.

The sealing layer 18 comprises a plurality of layers of plastics film which are wrapped around the outer surface of the inner reinforcing layer 14 to provide a fluid tight seal between the inner and outer reinforcing layers 14 and 16.

An end fitting 28 is provided at each end of the inner tube 10 and serves to terminate the tube 10. The end fitting 28 may be, for example, the type of end fitting described in WO01/96772 or WO 2004/079248.

The hose 10 can be formed by: wrapping the inner wire 22 around a mandrel; wrapping the inner reinforcing layer 14 around the inner wire 22; wrapping the sealing layer 18 around the inner reinforcing layer 14; wrapping the outer reinforcing layer 16 around the sealing layer 16, pulling the tubular sheath over the outer reinforcing layer 16, wrapping the outer wire 24 around the sheath 20, and applying the insulation layer 26 over the outer wire 24 and the sheath 20.

The rigid conduit 30 comprises a metal tube 32 which carries an outer water-proof coating 34.

There is an annulus 36 formed between the metal tube 30 and the hose 10. The annulus 36 may be left as free space, or may be partially or completely filled with an insulation material 38 (as shown in FIG. 1). When the annulus is left as free space, then spacers (not shown) may be provided to hold the hose 10 in position relative to the rigid conduit 30. The spacers may be disc-shaped, with an inner circular aperture which receives the hose 10.

The fluid to be transported can flow through the substantially cylindrical space 40 within the hose 10.

Figure 3:
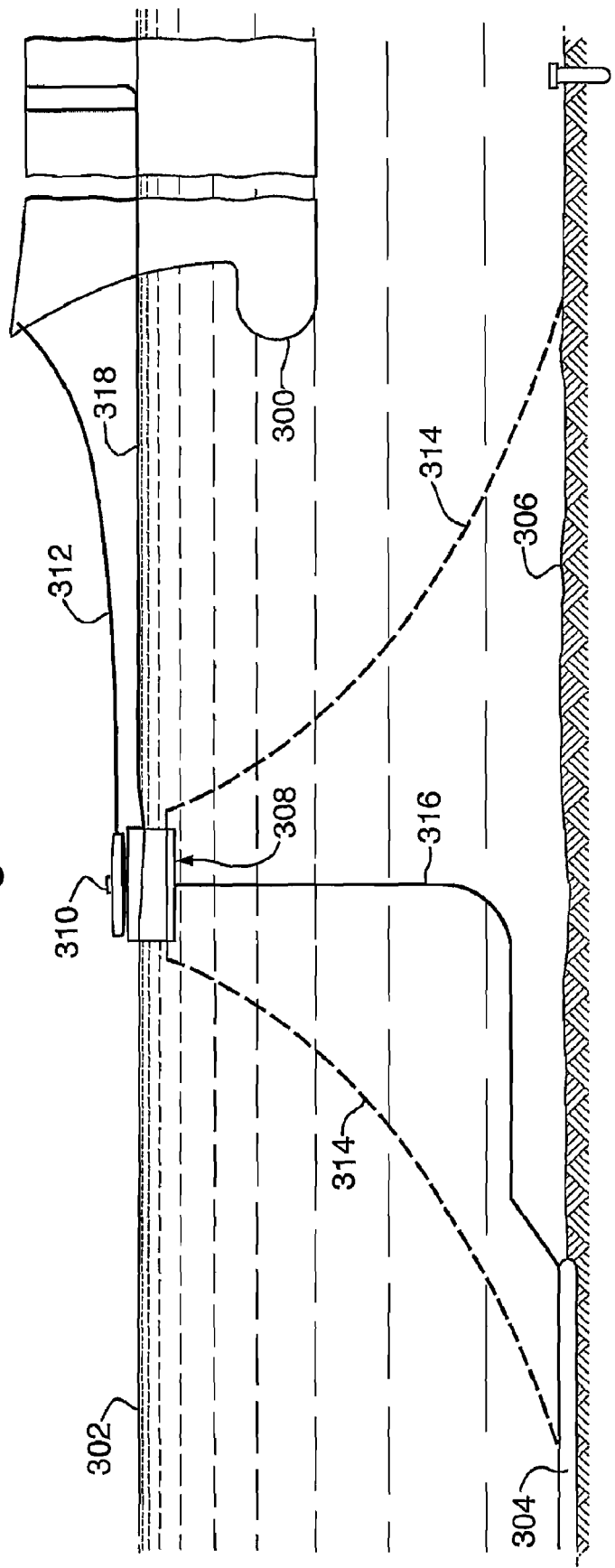
FIG. 3 is a schematic diagram illustrating a system for delivering the cryogenic fluid from a ship to the pipe according to the invention.

FIG. 3 is an illustration of an exemplary system utilising the pipe 100 according to the invention. The system shown in FIG. 3 is a CALM system, but the pipe 100 could equally well be applied in other systems, such as the SALM system, the CMBM system and the STM system.

In FIG. 3, a ship 300 containing an LNG storage unit (not shown) floats on the surface of the sea 302. I submarine pipeline 304 runs along the seabed 306. A surface mooring buoy 308 floats on the surface of the water, some distance from the ship 300. The buoy 308 includes a rotatable turntable 310 at the top thereof, which can swivel relative to the underlying part of the buoy 308. A mooring rope 312 extends from the ship 300 to the turntable 310, and anchor chains 314 extend from the base of the buoy 308 to the seabed 306.

A hose 316 extends from the ship 300 to the buoy 308. The hose 316 has a high buoyancy, so that it can float on the surface of the water.

A hose 318 extends from the buoy 308 to the pipeline 304. The hose 318 is connected to the hose 316, whereby fluids can flow from the storage unit on the ship 302 to the pipeline 304 (or vice versa). The pipeline 314 is constructed from lengths of the pipe 10 shown in FIG. 1.

It will be appreciated that the invention described above may be modified within the scope of the claims.

The invention claimed is:

1. A pipe comprising an outer rigid conduit and an inner tubular structure, the inner tubular structure comprising a flexible hose, wherein the hose comprises a tubular body disposed between inner and outer gripping members, the tubular body including a sealing layer, and being formed of a material capable of withstanding cryogenic temperatures, wherein the inner tubular structure has insulation properties sufficient to protect the outer conduit from the low temperature of cryogenic fluid flowing within the inner tubular structure, wherein the ends of the rigid conduit and the flexible hose are sealed to prevent the ingress of fluids between the rigid conduit and the hose.

2. A pipe according to claim 1, wherein at least one end of the pipe is adapted to be connected to an underwater riser.

3. A hose according to claim 1 or 2, wherein the tubular body comprises at least two reinforcing layers with the sealing layer sandwiched therebetween.

4. A hose according to claim 1 or 2, wherein the hose further includes an axial strengthening means.

5. A hose according to claim 4, wherein the axial strengthening means comprises a generally tubular braid formed of a sheet of material provided in a tubular shape.

6. A hose according to claim 4, wherein the axial strengthening means comprises a plurality of axial strengthening strips extending along the length of the hose.

7. A hose according to claim 3, wherein each reinforcing layer is formed of a sheet of material which has been wound into a tubular form in the inner tube.

8. A hose according to claim 1, wherein the sealing layer is formed of a sheet of material which has been wound into a tubular form in the hose.

9. A hose according to claim 1, wherein the insulation layer is incorporated in the hose.

10. A hose according to claim 1 wherein the insulation layer is disposed between the inner and outer gripping members.

11. A hose according to claim 1, wherein the insulation layer overlies the outer gripping member.

12. A hose according to claim 11, wherein the insulation layer comprises an elongate member, made of an insulating material, having opposing longitudinal edges, the elongate member being helically wound around the tubular body such that the opposing longitudinal edges of the layer are in an adjacent or overlapping arrangement, wherein each longitudinal edge includes a formation capable of interengaging with a cooperating formation on the opposing longitudinal edge.

13. A hose according to claim 9, 10 or 11, wherein the insulation layer includes a fabric formed of basalt fibres.

14. A hose according to claim 1, further comprising an end fitting disposed at each end of the hose.

15. A hose according to claim 1, wherein the inner and outer gripping members of the hose are helical gripping members.

16. A hose according to claim 1, wherein the inner and outer gripping members of the hose are helical wires.

17. A pipeline comprising a plurality of pipes as defined in claim 1, said pipes being connected end to end.

18. A system for transporting fluids between a first surface offshore structure and a second surface offshore structure, comprising: a first riser operatively connected to the first surface offshore structure and to a first end of a pipeline arranged along a seabed; a second riser operatively connected to the second surface offshore structure and to a second end of the pipeline, whereby fluid can flow from the first surface offshore structure to the second surface offshore structure or vice versa, at least part of the pipeline further comprising an outer rigid conduit and an inner tubular structure, the inner tubular structure comprising a flexible hose, wherein the hose comprises a tubular body disposed between inner and outer gripping members, the tubular body including a sealing layer, and being formed of a material capable of withstanding cryogenic temperatures, wherein the inner tubular structure has insulation properties sufficient to protect the outer conduit from the low temperature of cryogenic fluid flowing within the inner tubular structure, wherein the ends of the rigid conduit and the flexible hose are sealed to prevent the ingress of fluids between the rigid conduit and the hose.

19. A system for transporting fluids between a first surface offshore structure and a land-based structure, comprising: a first riser operatively connected to the first surface offshore structure and to a first end of a pipeline arranged along a seabed; a pipe operatively connected to the land based structure and to a second end of the pipeline, whereby fluid can flow from the first surface offshore structure to the land-based structure or vice versa, at least part of the pipeline further comprising an outer rigid conduit and an inner tubular structure, the inner tubular structure comprising a flexible hose, wherein the hose comprises a tubular body disposed between inner and outer gripping members, the tubular body including a sealing layer, and being formed of a material capable of withstanding cryogenic temperatures, wherein the inner tubular structure has insulation properties sufficient to protect the outer conduit from the low temperature of cryogenic fluid flowing within the inner tubular structure, wherein the ends of the rigid conduit and the flexible hose are sealed to prevent the ingress of fluids between the rigid conduit and the hose.

20. A hose according to claim 5, wherein the axial strengthening means comprises a plurality of axial strengthening strips extending along the length of the hose.

21. A hose according to claim 6, wherein the or each reinforcing layer is formed of a sheet of material which has been wound into a tubular form in the inner tube.

22. A hose according to claim 6, wherein the sealing layer is formed of a sheet of material which has been wound into a tubular form in the hose.

23. A hose according to claim 6, wherein the insulation layer is incorporated in the hose.

24. A hose according to claim 6 wherein the insulation layer is disposed between the inner and outer gripping members.

25. A hose according to claim 6, wherein the insulation layer overlies the outer gripping member.

26. A hose according to claim 6, further comprising an end fitting disposed at each end of the hose.

27. A hose according to claim 6, wherein the inner and outer gripping members of the hose are helical gripping members.

28. A hose according to claim 6, wherein the inner and outer gripping members of the hose are helical wires.

29. A pipeline comprising a plurality of pipes as defined in claim 6, said pipes being connected end to end.

* * * * *